Figure 4:
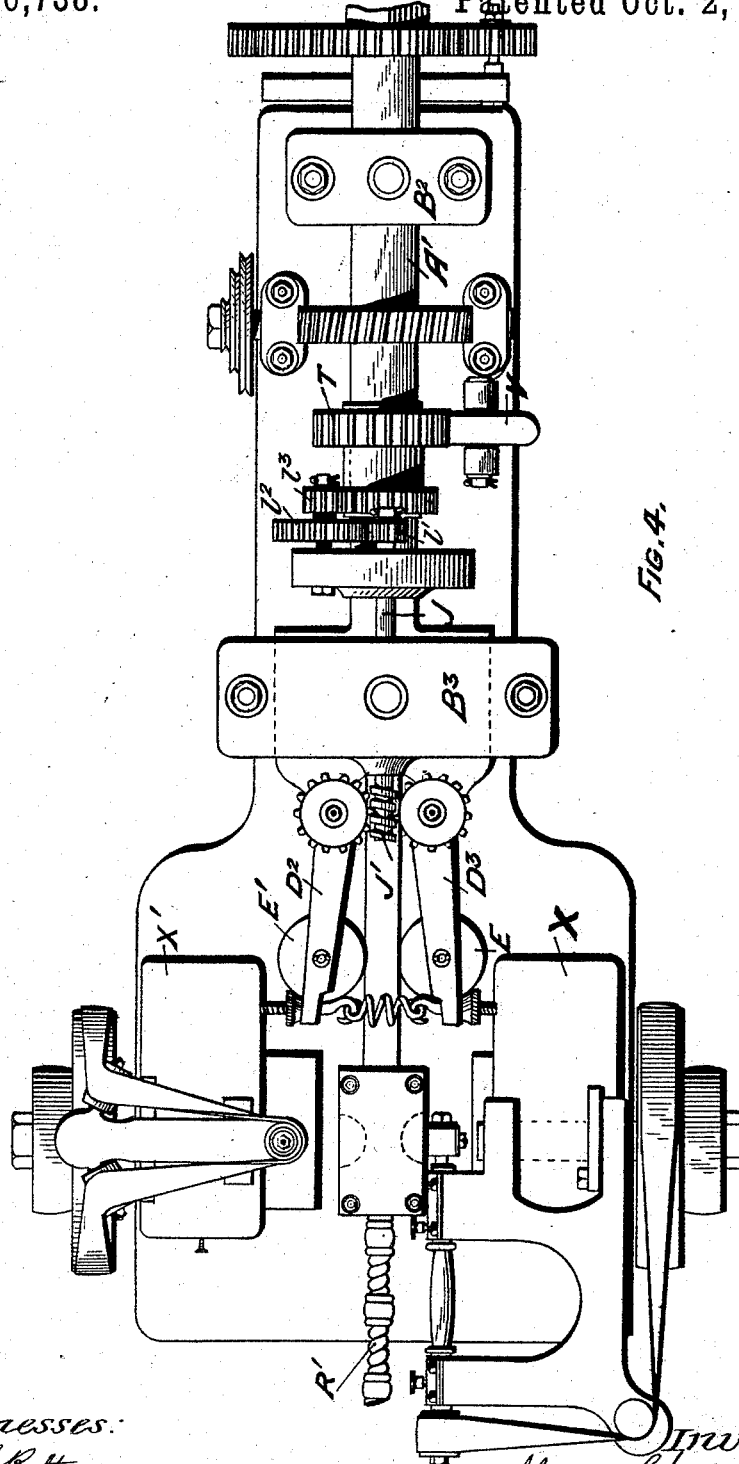

(No Model.)  4 Sheets—Sheet 1.
A. C. PEMBERTON.
MACHINE FOR CUTTING SPIRAL OR TURNED MOLDINGS AND AUTOMATICALLY TURNING ARTICLES FROM RODS.
No. 526,738.  Patented Oct. 2, 1894.
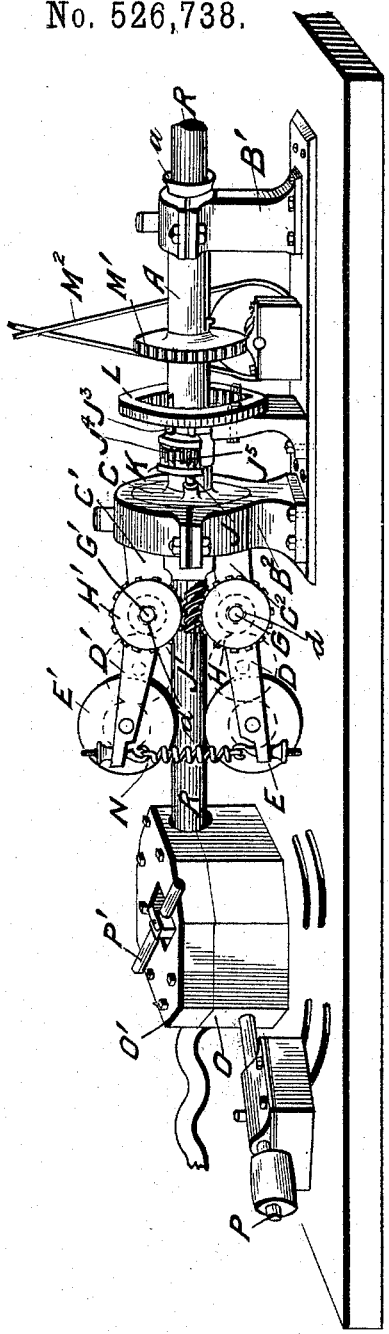
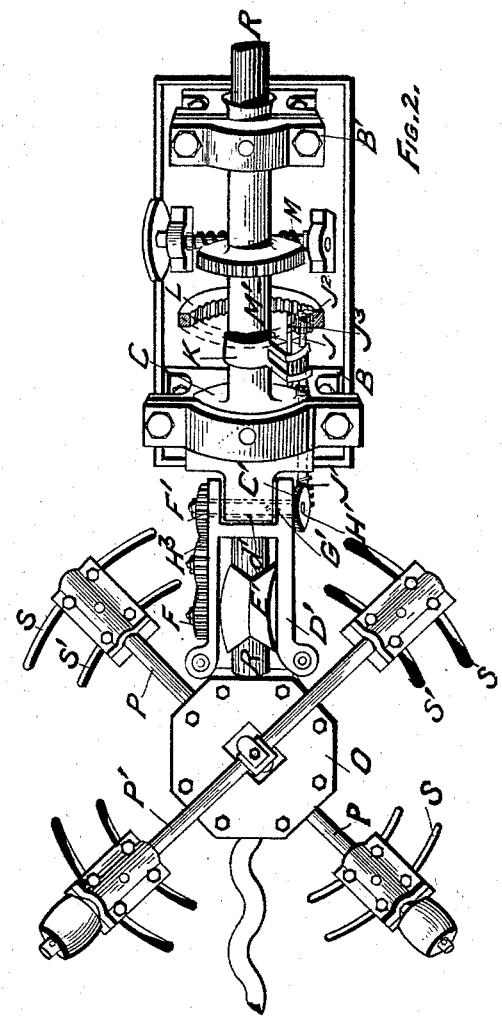
Witnesses:
E. K. Bolton
H. van Oldenneel
Inventor:
Algernon Charles Pemberton
By Richardson
his Attorneys.

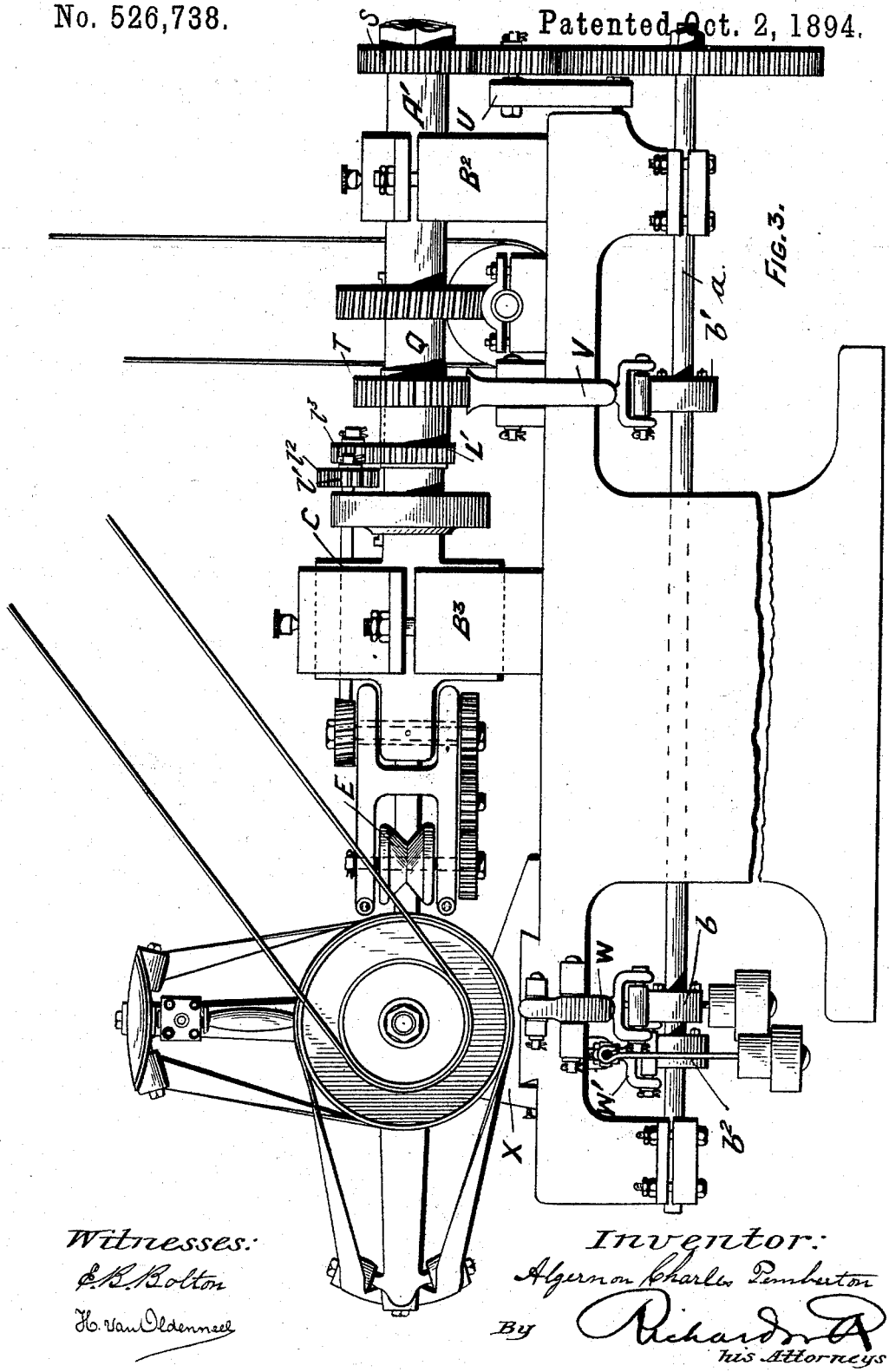

(No Model.) 4 Sheets—Sheet 3.

A. C. PEMBERTON.
MACHINE FOR CUTTING SPIRAL OR TURNED MOLDINGS AND AUTOMATICALLY TURNING ARTICLES FROM RODS.

No. 526,738. Patented Oct. 2, 1894.

Witnesses:
E. B. Bolton
H. van Oldenneel

Inventor:
Algernon Charles Pemberton
By Richard
his Attorneys

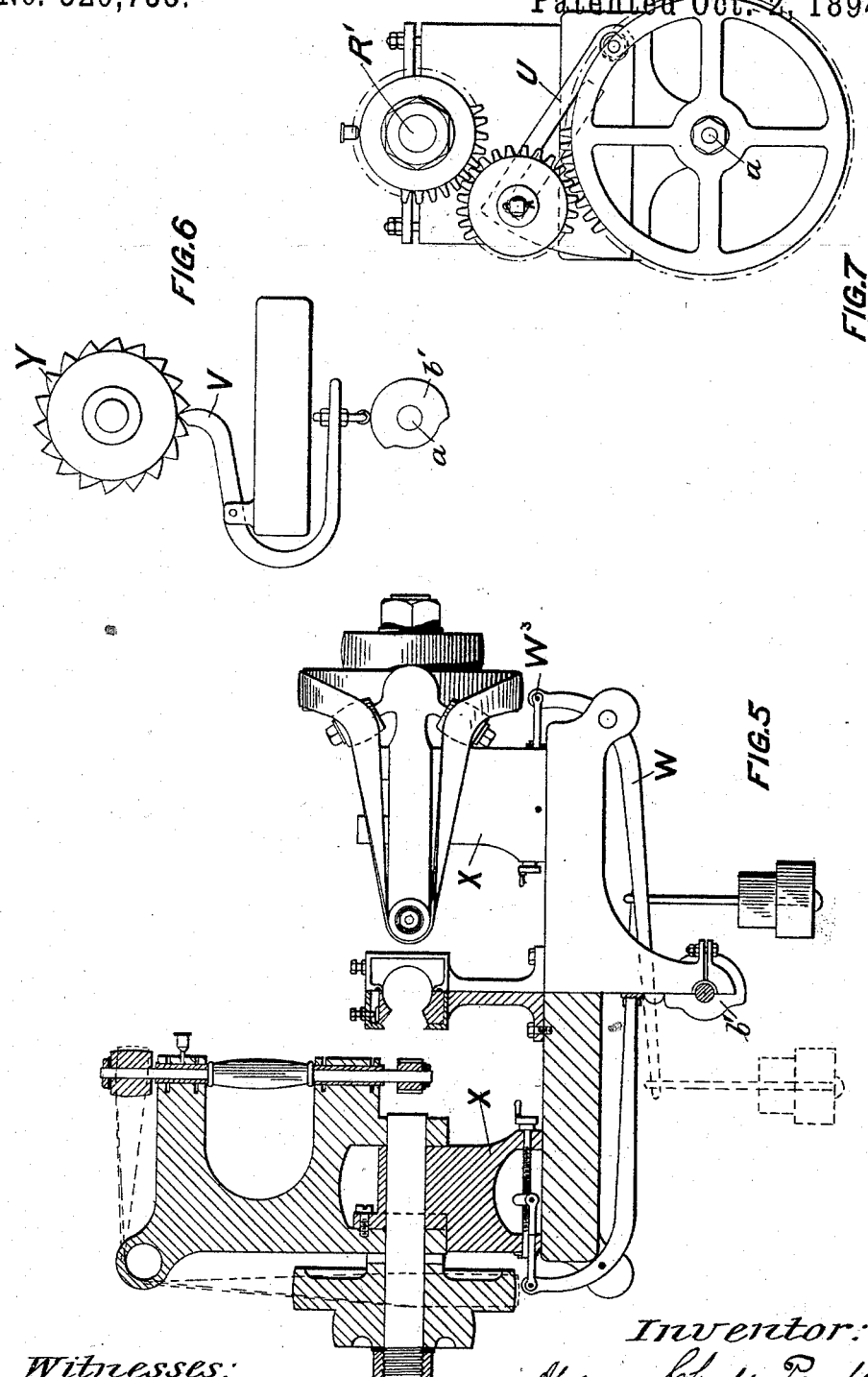

UNITED STATES PATENT OFFICE.

ALGERNON C. PEMBERTON, OF LONDON, ENGLAND.

MACHINE FOR CUTTING SPIRAL OR TURNED MOLDINGS AND AUTOMATICALLY TURNING ARTICLES FROM RODS.

SPECIFICATION forming part of Letters Patent No. 526,738, dated October 2, 1894.

Application filed January 20, 1894. Serial No. 497,563. (No model.) Patented in England April 10, 1891, No. 6,163, and in Germnay January 24, 1892, No. 65,038.

*To all whom it may concern:*

Be it known that I, ALGERNON C. PEMBERTON, a subject of the Queen of England, residing at London, England, have invented certain new and useful Improvements in Machines for Cutting Spiral or Turned Moldings and Automatically Turning Articles from Rods and the Like, of which the following is a specification.

A patent for this invention has been granted, in Great Britain, No. 6,163, dated April 10, 1891, and in Germany, No. 65,038, dated January 24, 1892.

This invention has reference to the manner in which I construct and arrange machines for cutting spiral and other turned moldings, and for automatically turning articles from a rod with or without screwed portions thereon.

By my improved machine, I am enabled to rapidly cut moldings of which the character of the design may be either of a plain circular nature, or with a spiral upon its surface, or it may be a combination of both. I am also enabled to automatically turn articles from a blank rod of wood or other material, with or without screwed portions upon them.

In order that my invention may be readily understood, I append hereunto four sheets of explanatory drawings to be hereinafter referred to.

In one method of carrying my invention into effect I construct a machine as shown in the accompanying drawings.

Sheet 1, Figure 1, is a front elevation and Fig. 2 a plan of the essential portions of my improved machine for cutting spiral moldings upon a rod of wood or other required material for decoration and other purposes. Fig. 3, is a side elevation of a modified form of machine. Fig. 4, is a plan; Fig. 5, a front semi-sectional elevation of a part of the machine. Fig. 6, is a detail view of the intermittent operating mechanism, and Fig. 7, is an end elevation of a detail.

In this machine I employ a roller feeding arrangement of mechanism so contrived by my peculiar arrangement of gearing that it propels the blank rod forward with a regular spiral motion through a guide or steadying block. While the rod or blank piece of material to be operated upon, is thus steadied within the block, I cause revolving cutters to be brought into contact with the rod for producing the desired pattern upon its surface.

I will now describe the action of my invention in relation to the machine illustrated on Sheet 1 of the accompanying drawings. In this machine, I employ a hollow mandrel A, mounted in bearings $B'$ $B^2$ having its bore of a sufficiently large dimension to allow the blank of wood or other material which is to be operated upon to freely pass through it from end to end. At one end of the mandrel A and preferably that nearest the revolving cutter or cutters I mount or connect a face plate C having a hole through its center of the same size as the mandrel hole $a$. This face plate I make with its rim or edge of sufficient width to take a bearing in and revolve when supported in the plumber block $B^2$. Upon this face plate I form or secure lugs $C'$ $C^2$, to which I hinge by means of brackets D D' two rollers E E', these rollers being separately geared by two or more pinions or wheels F F' $H^3$ to two axles G, G' which pass through the center of hollow pins or bushes $d$, $d'$ on which the brackets D D' hinge. Upon the opposite end of the axles G G' I mount worm pinions or worm wheels H H' to work into and receive motion from the worm J' carried upon the worm spindle J. The spindle J, I pass through a bearing hole in the face plate C, and then carry it through another bearing formed within a lug or arm K securely connected to the mandrel A so that it may receive upon its outer end a pinion $J^2$ which has motion imparted to it by gearing into the annular fixed wheel L. I give motion to the mandrel A, by any convenient means, and illustrate in Figs. 1 and 2 a worm M, and worm wheel M' driven by pulley and belting $M^2$. When the mandrel A is revolved, the pinion $J^2$ in consequence of being geared to the fixed annular wheel L, is set in motion, and thus also, the worm and worm spindle J, which transmit their motion to the two worm wheels H, H' and by the gearing wheels F, $H^3$ F' cause the rollers E E' to revolve upon their own axles within the open ends of the brackets D D'.

These rollers with their brackets also revolve with the mandrel and as they grip the surface of the rod by being drawn together by spiral springs N, the rod R has a compound movement given to it, and thus a regular spiral motion is produced upon the blank or rod, which is fed forward by the rollers E E', revolving in opposite directions while gripping its surface. The pitch of the spiral I vary by altering the gearing wheels to secure any desired comparative motion of rollers to the revolutions made by the mandrel. One convenient method of altering the pitch of the spiral is to make the axles carrying the rollers E E' square between the forks of the brackets D D' and so arranged that they can be readily withdrawn by removing a pin and washer at the end or opposite the gear wheels F. Other rollers of a different diameter can then be readily substituted. Greater variation in speed can be offered by making the studs upon which the center gear wheels F revolve removable in slots in the bracket D, and substituting a different train of wheels. Having secured the spiral feeding of the blank R, I fix a block of wood or metal O, as close up to the rollers as possible. This block, for convenience, I make in halves, bolted together, and provide it with a hole or opening through which the blank can just pass without vibration. In the top and bottom, and also in the sides if desired, I cut out semicircular holes wide enough to allow the cutters to operate on the blank as it revolves and moves forward. These cutters I attach to ordinary cutter blocks on shafts of the general pattern well known to machine wood workers. In Fig. 1, two cutter spindles P P' are shown one P' engaging on the top of the blank and the other underneath fixed to the shaft P and hidden from sight by the block O. In Fig. 1 the cutter shaft P' is shown broken off and its bearings removed, to permit of a clearer view of the block O.

If more than two cutter blocks are required for an intricate spiral, the additional ones must be attached to vertical shafts arranged at a proper angle to the work. This also applies to the horizontal cutter shafts, and may be taken to be a right angle to the line of the pitch of the spiral.

To facilitate the adjustment of the shafts carrying the cutter blocks so that the cutters shall lie in the correct line of the pitch of various spirals, the holding down bolts of the plumber blocks in which the cutter shafts revolve are made to slide in slots S S' in the table or bed of the machine, these slots permitting of the ready removal of the shafts for different pitches and for changing the pitch from right hand to left.

To change the hand of the pitch, the motion imparted to the mandrel is reversed; a convenient manner being by crossing the driving belt and the pinion $J^2$ is moved to the axle $J^3$, by which means the motion given to the worm J is continued in the same direction, owing to the reversing action of the two pinions $J^4$, $J^5$, which then come into effect. Having reversed the feed of the blank, the cutter shafts are moved round about a quarter of a circle, until P occupies the position occupied by P'.

I construct my improved machine in another manner as illustrated in Sheets 2, 3 and 4 herewith, when arranging my machine to cut moldings around a blank rod with or without a spiral pattern, or of a pattern in which both a plain and spiral molding are employed; the machine being also capable of automatically turning articles from a blank of wood or other material, with or without screwed portions thereon. I arrange my feeding mechanism in this machine so that when desired, the blank may be screwed for any distance along its surface, and then merely revolved without any forward motion being given to it. In this machine I mount a hollow mandrel A', as hereinbefore described, in bearings $B^2$ $B^3$ and I carry on the mandrel a face plate C' with revolving brackets $D^2$ $D^3$, and gearing for actuating the rollers, the speed of which I vary as hereinbefore described or as shown in Figs. 3 and 4, in which a small train of spur wheels $l'$ $l^2$ $l^3$ is employed. These wheels I carry on studs bolted in a concentric slot formed within the lug K the motion being imparted to them by means of a wheel L carried upon the mandrel A.

When the machine is to be employed for cutting spirals or automatically turning, I construct it as follows: In place of the horizontal cutters shown in Figs. 1 and 2, I prefer to use vertical cutters which I arrange so that they can swivel around a center struck through the line in which they engage the work to be done. I also mount them on sliding carriages for facilitating the operation of getting them in and out of cut. I then make the wheel L, (Figs. 3 and 4) from which the pinion derives its motion with an overhanging flange on which the teeth are cut, and instead of having it fixed, I make it a complete wheel with its boss bored out to fit on the mandrel A'. I prolong this boss until it is some few inches long on the rear side and at this end I fix a ratchet wheel T. When using an internal wheel instead of a spur wheel shown in Figs. 3 and 4 I sometimes cut the ratchet teeth upon the outside edge of the wheel to save the employment of a separate wheel. In a convenient position, and parallel to the mandrel, I fix a shaft $a$, and arrange it so that it can be geared in connection with the mandrel A, by a train of gearing wheels and a quadrant plate U. This shaft $a$, carries two or more cams $b$, $b'$, one of which $b'$, actuates the pawl V in connection with the ratchet wheel T, and is arranged so that it either allows the wheel to run round freely upon the mandrel A' or by engaging in its teeth, prevents any motion, the mandrel A' revolving quite independently of it. The other cams $b$, $b^2$, are connected by bell crank levers W, W' and connecting rods $W^3$, with the carriages X carrying the cutter shafts. The action of the machine is then capable of either cutting a molding in which a repetition of a turned pattern is produced along its length or a turned pattern can be produced intermixed with a spiral at regular intervals. It is also capable of automatically turning articles from a rod with or without screwed portions such as door knobs, stoppers for screw-necked bottles, and for other purposes.

As an example of the method of employing my improved machine I will describe my method of arranging the same to produce a molding in which a third portion is to be screwed with a spiral, having a pitch of one inch, and the next portion for two inches in length is to have a circular beaded pattern upon it. Shown at R' Fig. 4. The parallel shaft $a$, I then connect to the mandrel A by means of change gear wheels S, so proportioned that $a$, revolves once for every five revolutions of the mandrel A. The cam $b'$, I set so that the ratchet wheel T is held rigid by the pawl V for every three revolutions of the mandrel A, and released during the other two. The rollers E, E' I set to give a pitch of one inch, and I arrange the cam $b$, connecting the carriage carrying the cutter shaft which is employed in cutting the spiral, so that it will be in cut during the three revolutions and withdrawn during the next two. The other cam $b^2$ in connection with the carriage carrying the cutter shaft, to be employed in cutting the turned portion of the molding, I arrange so that it is in cut during the time when the blank is being revolved without having any traveling motion upon it.

By varying the cams and trains of gearing a great variety of patterns can be cut; or taper spirals may be produced by bringing the cutter or cutters gradually into the full depth of cut required at the smaller diameter of the spiral.

I do not limit the application of my invention to any particular arrangement of machine framing or system of driving the mandrel, neither do I confine the arrangement of my machines to the particular system of mounting and actuating the cutters herein set forth, but I modify the essential features of my invention hereinbefore described to suit any particular requirement for producing any desired form of molding, or for turning any peculiar pattern.

Having now particularly described and ascertained the nature of my said invention and in what manner the same is to be performed, I declare that what I claim is—

1. In combination, the rotary mandrel the feed rollers E E' rotating therewith, the pivoted arms carrying the feed rollers, the gears at the pivots of the arms, the driving connections to said gears and the intermediate gearing between the pivot gears and the rollers for revolving them on their axes for feeding the blanks.

2. In a machine for turning blanks of wood or other suitable material, the arrangement of a pair of roller feed brackets, such as D D' which revolve with the mandrel A, said arms or brackets being pivotally supported and extending lengthwise of the mandrel substantially as and for the purposes herein set forth and as illustrated in the accompanying drawings.

3. In combination, the rotary mandrel, the feed rollers carried thereby to revolve therewith, the gearing for rotating the said rollers on their axes, the gear about the mandrel for transmitting movement to the roller gearing and the means for throwing the said mandrel gear into and out of action to produce an intermittent feed, substantially as described.

4. In combination, the rotary mandrel, the feed rollers carried thereby to revolve therewith, the gearing for rotating the said rollers on their axes, the gear about the mandrel for transmitting movement to the roller gearing and the means for throwing the said mandrel gear into and out of action, comprising the pawl, the cam, the cam shaft and the mechanism for driving the cam shaft, substantially as described.

5. In combination, the cutter, the rotary mandrel, the feed rollers carried thereby to revolve therewith, and the driving means for the said rollers operated from a gear on the mandrel and the means for throwing the roller driving mechanism into and out of action, substantially as described.

In witness whereof I have hereunto set my hand in presence of two witnesses.

A. C. PEMBERTON.

Witnesses:
 GERALD F. BIRD,
 HERBERT SELLEY,
*Clerks to Comerford & Co., 7 Tokenhouse Yard, London, Public Notaries.*